United States Patent [19]

Larson et al.

[11] 4,043,419
[45] Aug. 23, 1977

[54] LOAD SENSING POWER STEERING SYSTEM

[75] Inventors: Bernard J. Larson, New Hope; Oliver Wendell Johnson, Chaska; James Kwok-fun Yip, Richfield, all of Minn.

[73] Assignee: Eaton Corporation, Cleveland, Ohio

[21] Appl. No.: 693,052

[22] Filed: June 4, 1976

[51] Int. Cl.² .................... B62D 5/08; F15B 11/16
[52] U.S. Cl. .................................... 180/132; 60/384; 60/420; 60/450; 60/484
[58] Field of Search ............... 60/384, 385, 387, 388, 60/420, 422, 450, 484, 494; 91/412, 444, 446; 180/132

[56] References Cited

U.S. PATENT DOCUMENTS

| | | |
|---|---|---|
| 2,503,870 | 4/1950 | Harrington ........................ 91/446 |
| 3,455,210 | 7/1969 | All .................................... 91/446 |
| 3,915,253 | 10/1975 | Ott et al. ........................ 60/384 X |
| 3,960,234 | 6/1976 | Morgan ............................ 180/132 |
| Re. 25,126 | 2/1962 | Charlson ........................... 91/467 |

Primary Examiner—Edgar W. Geoghegan
Attorney, Agent, or Firm—Teagno & Toddy

[57] ABSTRACT

A power steering system is disclosed which selectively controls the flow of fluid to a steering motor and an auxiliary device, and may have as its source of pressurized fluid either a fixed displacement pump, a variable displacement pump, or a load sensing pump. The system includes a steering control valve disposed between the pump and the steering motor, and an externally pilot operated flow control valve, specifically, a priority valve, disposed between the pump and the steering control valve, such that the entire system flow enters the priority valve.

18 Claims, 9 Drawing Figures

LOAD SENSING POWER STEERING SYSTEM

BACKGROUND OF THE DISCLOSURE

The present invention relates to load sensing power steering systems, and more particularly, to such systems which simultaneously provide flow to an auxiliary circuit.

It has long been an object of those working in the hydraulics art to provide flow control circuits for controlling fluid actuated devices in which it is possible to control the rate of fluid flow, and therefore, the operational speed of the fluid actuated device, independent of the varying external loads imposed upon the fluid actuated device. This has been considered especially desirable in the development of hydrostatic power steering systems utilizing a source of pressurized fluid feeding a power steering cylinder to turn a pair of ground-engaging wheels, with a steering control valve disposed between the source of fluid and the cylinder and responsive to rotation of the steering wheel to permit a controlled rate of fluid flow to the cylinder.

One of the early arrangements for making the rate of fluid flow to the fluid actuated device (the fluid motor) dependent only on the setting of the flow control valve, and not dependent on the load of the fluid motor, is illustrated in U.S. Pat. No. 2,503,870, issued to Harrington. The system of the referenced patent discloses a well-known four-way directional flow control valve disposed in series flow relationship between a fluid pump and a fluid motor. Disposed in series flow relationship between the pump and the directional flow control valve is a flow regulating valve having a valve member positioned in accordance with the pressure drop across the variable orifice formed between the pressure port and the motor port of the directional flow control valve, upon actuation thereof. The valve member in the flow regulating valve is operable to bleed off to the reservoir a portion of the incoming flow from the pump in a manner which is now well-known in the art, to maintain a relatively constant pressure drop across the variable orifice of the directional flow control valve.

A subsequent step in the development of such systems is illustrated in U.S. Pat. No. 3,445,210, issued to J. D. Allen, and assigned to the assignee of the present invention. The flow control arrangement illustrated in the Allen patent is generally similar in purpose and operation to that shown in the Harrington patent, except that the Allen arrangement uses a pressure compensating valve in place of the flow regulating valve of Harrington, and instead of bypassing excess flow to the reservoir, the pressure compensating valve of Allen makes the excess flow available for operation of an auxiliary fluid circuit. This is made possible by the fact that the valve of Allen, unlike that of Harrington, is arranged such that the movable valve member is positioned in accordance with the pressure drop across the variable orifice of the directional flow control valve, and independently of the fluid pressure in the auxiliary fluid circuit.

In the development of hydrostatic power steering systems, there have been commercially available for more than a year prior to the date of the present application, systems in which a pressure signal sensed within the steering control valve has been used to control the stroke of a variable displacement pump, with the objective of maintaining a relatively constant pressure drop across the steering control valve, or a portin thereof, during variations in steering load. As used herein, the term "steering load" is intended to means and include a fluid pressure which exerts sufficient force within the steering motor to overcome the ground forces acting on the steered wheels.

The above-referenced commercially available system is illustrated in U.S. Pat. No. 3,915,253, issued to Ott et al, and includes a steering control valve which defines a first variable orifice operable to determine the fluid flow rate through the steering control valve, a second orifice which determines the direction of fluid flow (right turn or left turn), a fluid meter, a third orifice downstream from the fluid meter, a fourth variable orifice, the steering motor, and a fifth variable orifice on the return side of the steering motor. A pressure signal is taken just downstream from the third orifice and is communicated back to the stroke control mechanism of the variable displacement pump which is also responsive to a pressure signal just downstream from the output of the pump. Therefore, the pump is being controlled, in effect, by a load signal taken across the series combination of the first and second orifice, the fluid motor, and the third orifice. The system disclosed in the Ott patent provides a relatively large pressure drop across the series combination of the previously-mentioned orifices. If desired, it is well-known to reduce this pressure drop by simply eliminating the orifices located in series with the first variable orifice.

Among the major limitations resulting from the use of the steering system of the Ott patent are the lack of a high pressure carryover capability and that the system may be used only with the type of variable displacement pump and pressure compensator valve arrangement illustrated therein. The interest in steering systems having high pressure carryover capability has been greatly increasing in the past several years, in recognition of the need to use available fuel sources more efficiently. A hydrostatic power steering system having a high pressure carryover capability makes it possible to operate both the steering motor and an auxiliary device such as a back hoe or a crane boom using only one pump, while converting a greater percentage of the input energy to that pump into useful work.

It should be apparent that a power steering system which may be used with various pump configurations is of greater commercial value solely because of the increased system versatility. For example, it is then possible to have a closed center system, an open center system, or a load sensing system. Furthermore, such a versatile power steering system is more marketable because it is more easily interchangeable with currently-used systems on existing equipment.

In the typical hydrostatic power steering systems of the type to which the present invention relates, the steering control valve is designed to operate in response to a predetermined pressure differential across the variable orifice of the steering control valve which controls the rate of fluid flow through the steering control valve, and therefore, the rate of actuation of the steering cylinder. The variable orifice in the steering control valve varies from a minimum orifice area to a maximum orifice area in response to the turning of the steering wheel, and as the orifice area increases, the flow through the orifice increases. A particular steering control system is designed to operate at a predetermined rate of fluid flow through the steering control valve for a predetermined maximum valve deflection (for example, 10° of rotation of the valving). As is well-known in the art, the predetermined flow rate will occur at the maximum valve deflection only in response to a particular pressure drop across the orifice, and if the pressure drop across the variable orifice is greater than that for which the steering control valve was designed, the predetermined flow rate will occur at a smaller valve deflection than the predetermined maximum. Achieving the maximum rate of actuation contemplated by the design of the steering control valve, but a smaller valve deflection, results in an undesirable increase in the sensitivity of the steering system.

The need for a constant pressure drop across the variable orifice of the steering control valve and therefore, a constant input pressure to the steering control valve for a given steering load, represents a serious disadvantage in certain commercially available power steering systems which use a priority valve downstream of the pump, but which tee off of the line connecting the pump and priority valve to feed fluid to the steering control valve. In such an arrangement, the priority valve is not truly serving as a priority valve, but merely as a pressure compensating valve to bypass a certain portion of the pump output to the auxiliary circuit without simultaneously controlling the pressure of the fluid being fed to the steering control valve.

Another limitation on the use of load sensing power steering systems has been the effect of line losses, i.e., the effect of any pressure drops in the conduit feeding the steering control valve when the steering control valve is located remotely from the mechanism which controls the pressure of the fluid fed to the steering control valve in response to the pressure signals taken respectively upstream and downstream of the main control orifice of the steering control valve.

SUMMARY OF THE INVENTION

Accordingly, it is an object of the present invention to provide an improved hydrostatic power steering system of the type which is responsive to a steering load pressure signal.

It is another object of the present invention to provide such a power system which is capable of providing pressurized fluid to an auxiliary fluid circuit, while giving priority to the demands of the steering circuit in response to the steering load pressure signal.

As used herein, the term "priority valve" means and includes any valve which controls the flow from a fluid source to a primary load circuit and a secondary load circuit in response to the demand in the primary circuit (i.e., giving "priority" to the demands of the primary circuit).

It is a related object of the present invention to provide a power steering system in which the auxiliary fluid circuit may be closed center, open center, or load sensing, such that the pump arrangement used with the system may be fixed displacement, variable displacement or load sensing, respectively.

It is a further object of the present invention to provide a power steering system in accordance with the above-stated objects, which permits the steering control valve to be located remotely from the pump and the priority valve while eliminating the effect of line losses on the pressure signals which control the position of the pressure compensating valve member, and therefore, the flow division therethrough.

The above and other objects of the present invention are accomplished by the provision of an improved power steering system. The system controls the flow of fluid from the source which is either a fixed displacement pump, a pressure compensated, variable displacement pump, or a flow and pressure compensated, load-sensing pump. The fluid is utilized to selectively effect actuation of a power steering motor and an auxiliary device and the system comprises a steering control valve disposed in series flow relationship between the pump and the steering motor and including valving which is movable from a neutral position to either a right turn or left turn position. The steering control valve also includes a fluid meter having a metering element movable to measure the volume of fluid passing therethrough and a means coupling the metering member and the valving to impart follow-up movement to the valving in response to movement of the metering member. The steering control valve includes a valve body which defines fluid inlet and fluid return ports and a pair of motor ports connected to opposite sides of the power steering motor. The valve body and the valving define a fluid passage including a first variable orifice in series flow relationship between the fluid inlet port and the fluid meter. The valving is configured to have a predetermined pressure drop, at the predetermined flow rate, across the first varible orifice when the valving is in either of the turn positions.

The system further comprises a priority valve disposed in series flow relationship between the pump and the steering control valve, the priority valve including an inlet port in fluid communication with the pump, and receiving all of the system flow therein, a steering outlet port in fluid communication with the fluid inlet port of the steering control valve and an auxiliary outlet port in fluid communication with the auxiliary device. The priority valve includes a valve member disposed to control fluid flow from the inlet port to the outlet ports and a spring biasing the valve member toward a position permitting substantially all of the system flow to pass from the inlet port to the steering outlet port. The spring exerts a biasing force approximately equivalent to a predetermined pressure drop across the first varible orifice of the steering control valve to establish a steering flow rate through the steering outlet port and the first variable orifice. A load pressure signal is communicated from the downstream side of the first variable orifice to exert a biasing force on the valve member of the priority valve in the same direction as the spring, and a pilot pressure signal taken from upstream of the first variable orifice is communicated to exert a biasing force on the valve member of the priority valve in opposition to the biasing force of the spring.

In accordance with another aspect of the present invention, if the steering control valve is disposed remotely from the pump and the priority valve (for example, about 6 feet or more away from the priority valve), the pilot pressure signal is taken immediately upstream from the first variable orifice, such as from within the inlet port of the steering control valve, so that the load pressure signal and the pilot pressure signal indicate accurately the pressure drop across the firt variable orifice, independent of any line losses that would occur if the pilot pressure signal were merely an internal pilot signal within the priority valve.

DESCRIPTION OF THE PREFERRED EMBODIMENT

Figure 1:
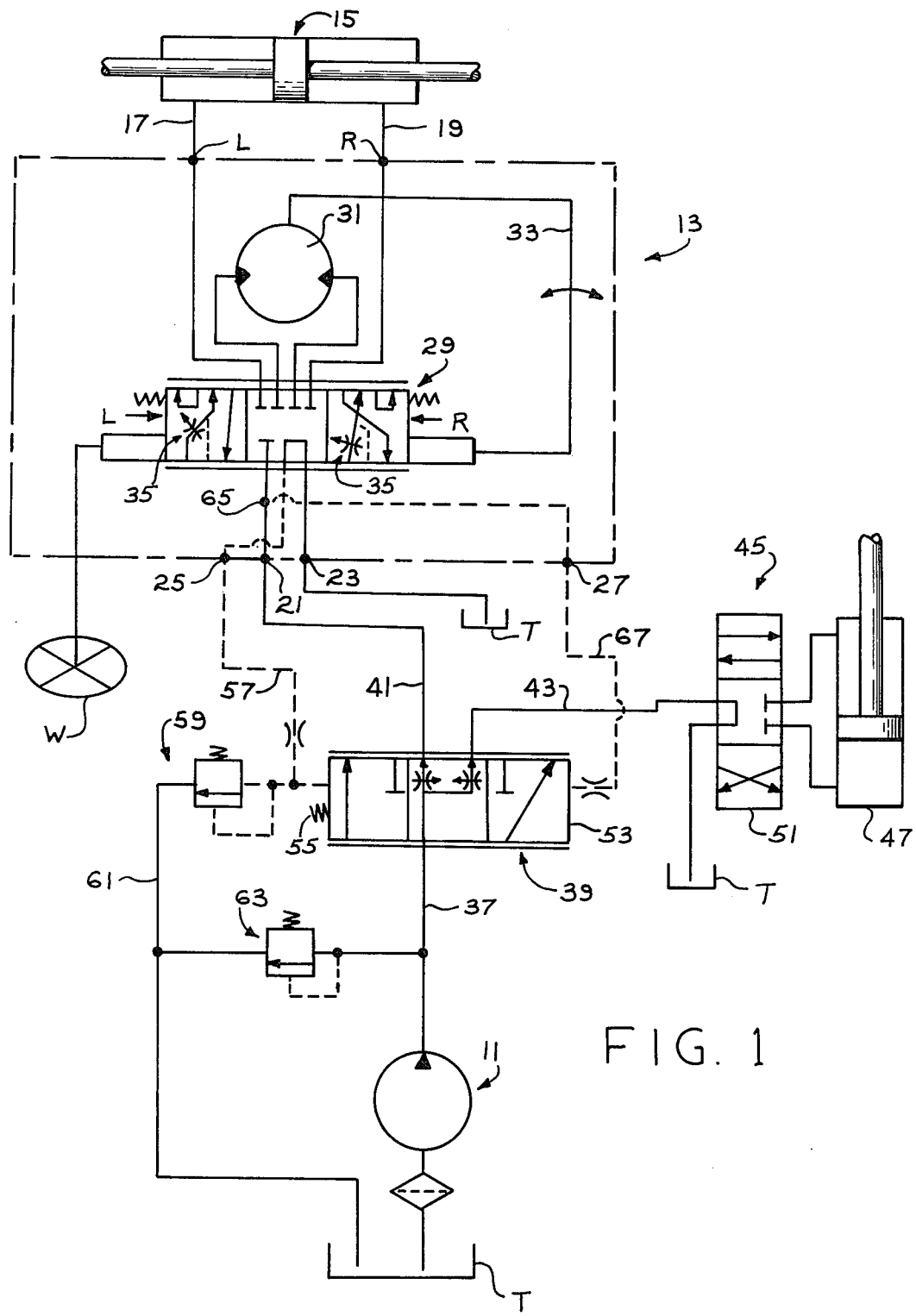
FIGS. 1, 2 and 3 are hydraulic schematics of the present invention utilized with three different types of auxiliary circuits and pump arrangements.

Referring now to the drawings, which are not intended to limit the present invention, FIG. 1 illustrates schematically a hydrostatic power steering system including a fixed displacement pump 11 which provides hydraulic fluid at a constant flow and variable pressure to a steering control valve, generally designated 13. Steering control valve 13 controls the flow and direction of pressurized fluid fed to a steering cylinder 15 for steering control of a pair of ground-engaging wheels (not shown).

The steering control valve 13, which may be of a type well known in the art, such as is illustrated in U.S. Pat. No. Re.25,126 (assigned to the assignee of the present invention and incorporated herein by reference), includes a left fluid port L and a right fluid port R which are connected to the opposite ends of the steering cylinder 15 by a pair of fluid conduits 17 and 19, respectively. The steering control valve 13 further includes a fluid inlet port 21, a fluid return port 23, a load signal port 25, and a pilot signal port 27. Disposed within the steering control valve 13 is a valving arrangement, generally designated 29, which is movable from its neutral position shown in FIG. 1 to either a right turn position R or a left turn position L. Although in the preferred embodiment, the valving arrangement 29 comprises a spool and sleeve for which actuation is effected by relative rotation thereof, as taught in U.S. Pat. No. Re.25,126, it will be understood that within the scope of the invention various other valving arrangement may be utilized. For example, rather than utilizing a spool and sleeve to define the various control orifices required, the control orifices may be defined by the housing and a valve sleeve, with the size of the orifices, and therefore the steering flow rate, varying with rotation of the sleeve relative to the housing, with axial movement of the sleeve relative to the housing, or with a combination of relative axial and rotational movement.

When the valving arrangement 29 is in either of the turn positions, the pressurized fluid passing through the valving 29 flows through a fluid meter 31, the function of which is to measure the proper amount of fluid to be fed to the appropriate fluid port L or R. As is well-known in the art, the fluid meter 31 is typically connected to the valving arrangement 29 by means of a mechanical follow-up 33.

Figure 9:
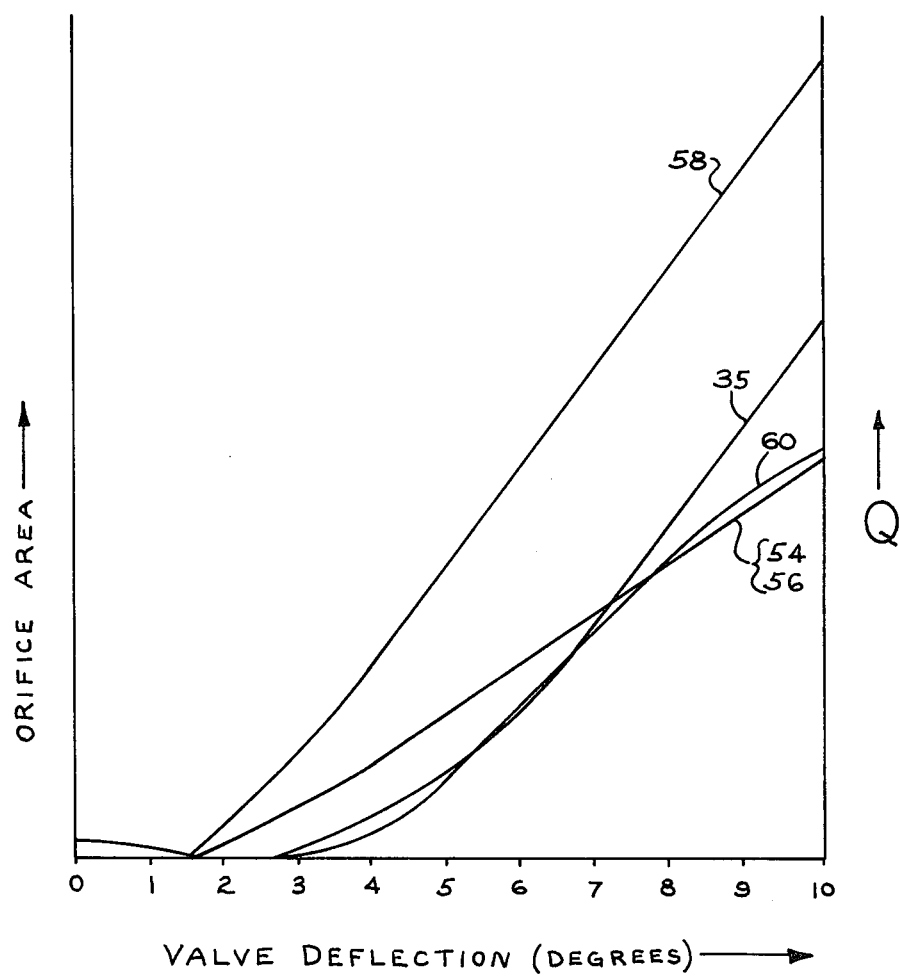
FIG. 9 is a graph of orifice area versus valve deflection.

In either of the turn positions, the valving 29 defines a variable orifice 35, the flow area of which is generally proportional (see FIG. 9) to the deflection of the valving 29 (i.e., the relative rotation of the spool and sleeve). Therefore, the rate of rotation of the steering wheel W determines the valve deflection and the rate of flow of fluid through the variable orifice 35 and eventually, to the steering cylinder 15.

Figure 8:
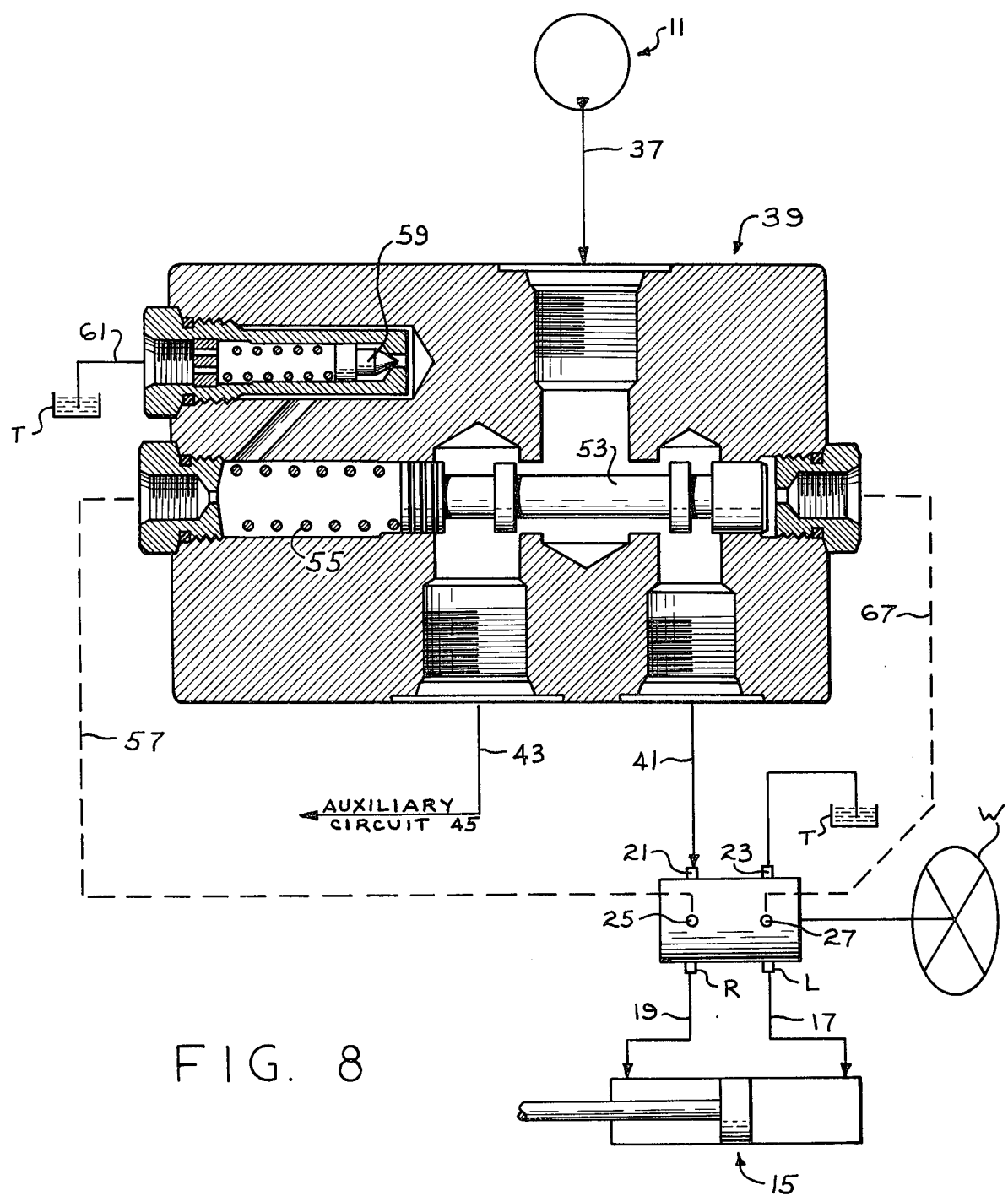
FIG. 8 is a partly schematic illustration of the power steering system shown in FIG. 1, including a cross section of the priority valve used therein.

The output of the fixed displacement pump 11 is fed by means of a fluid conduit 37 to a pilot-operated flow control valve, generally designated 39, and it is an essential feature of the present invention that substantially all of the output fluid from the pump 11 passes through the flow control valve 39. In its centered position, the flow control valve 39 provides a variably restricted flow, by means of a fluid conduit 41, to the inlet port 21 of the steering control valve 13 and also provides a variably restricted flow, by means of a fluid conduit 43, to an auxiliary fluid circuit, generally designated 45. The auxiliary circuit 45 may include various types of hydraulic components, in any desired degree of complexity, but for purposes of illustration, the circuit 45 includes a fluid cylinder 47 controlled by a conventional three-position, four-way valve 51 which is shown in FIG. 1 as an open-center valve to match the fixed displacement pump 11. The flow control valve 39, shown in greater detail in FIG. 8, includes a valve member 53 which is biased by means of a spring 55 toward a position permitting substantially all of the fluid in fluid conduit 37 to pass to fluid conduit 41. Immediately downstream of the variable orifice 35 a fluid pressure signal is communicated to the load signal port 25 from where it is communicated by means of a load signal line 57, through a damping orifice, to bias the valve member 53 in the same direction as does the spring 55. The load signal line 57 also communicates with a steering system relief valve 59, the outlet side of which is communicated by fluid conduit 61 back to tank. The steering relief valve 59 protects the steering system by guarding against undesirable pressure buildups therein, while a main system relief valve 63, connected in parallel between fluid conduis 37 and 61, protects the overall system against excessive pressure buildups.

In the embodiment of FIG. 1, it has been assumed that the steering control valve 13 is located remotely from the fixed displacement pump 11 and flow control valve 39. At a point, designated 65, disposed between the fluid inlet port 21 and the variable orifice 35, a pressure signal is communicated to the pressure signal port 27, and from the port 27 back to the flow control valve 39 by means of a pilot signal line 67 to exert a biasing force on the valve member 53, acting in opposition to that exerted by spring 55. It will be appreciated that the use of the signal lines 57 and 67 to communicate pressure signals from immediately downstream and upstream, respectively, of the variable orifice 35, provides opposing pressure signals across the ends of the valve member 53 which accurately represent the pressure drop across the variable orifice 35. Therefore, as used herein, the term "remotely" in reference to the location of the steering control valve 13 is intended to mean a separation from the flow control valve 39 which is sufficient, under the particular operating conditions, for the line losses in fluid conduit 41 to represent a substantial proprotion of the pressure drop across the variable orifice 35 as seen by the valve member 53.

Figure 2:
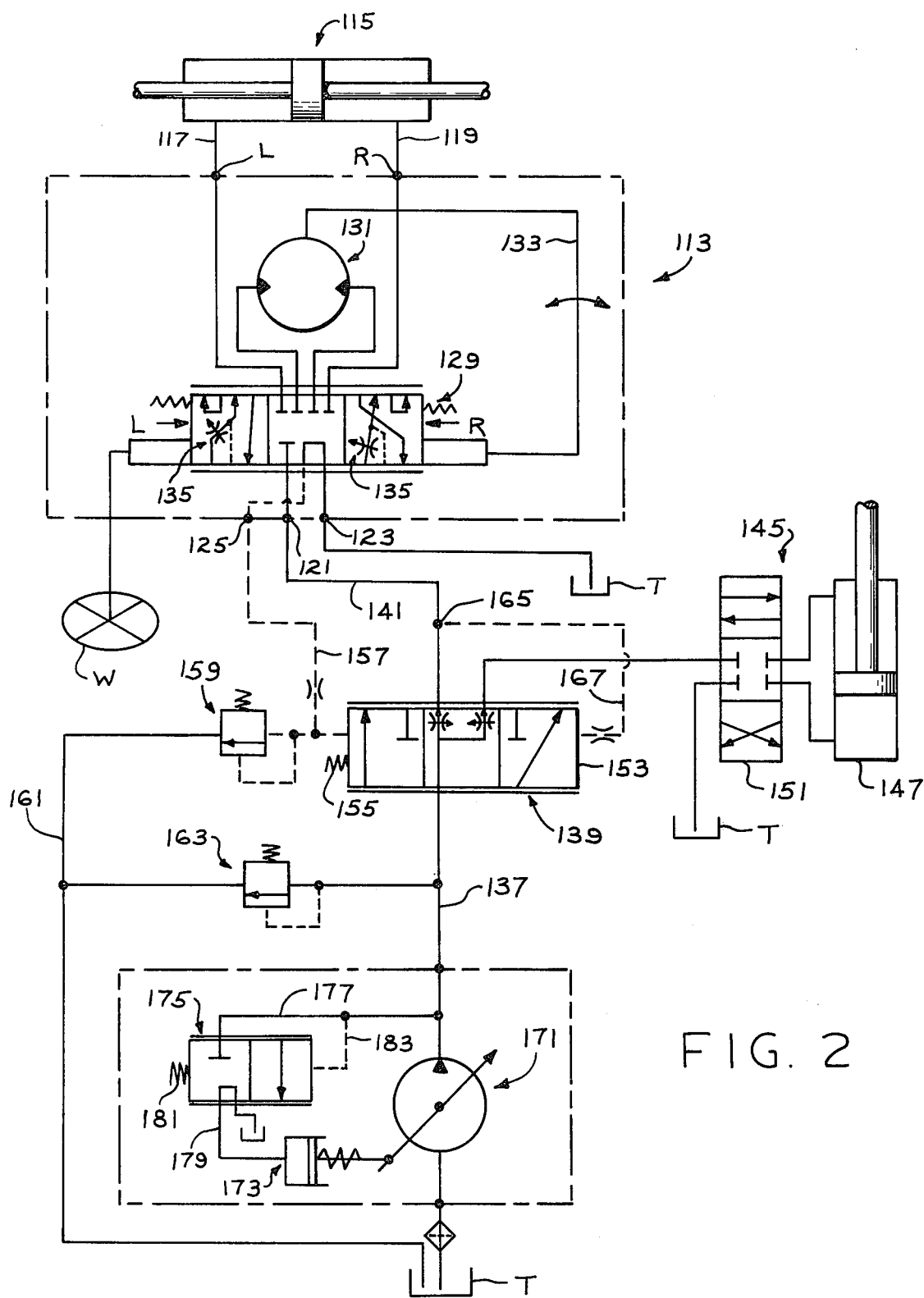

Referring now to FIG. 2, wherein like elements are referred to by like numerals, plus 100, the power steering system of the present invention is shown utilized with a variable displacement pump 171. The stroke of the variable displacement pump 171 is varied by a stroke control mechanism 173 and a pressure compensator valve 175. A fluid conduit 177 is connected between fluid conduit 137 and the inlet of pressure compensator valve 175, while the outlet of pressure compensator valve 175 is connected by means of fluid conduit 179 to the stroke control mechanism 173. The pressure compensator valve 175 is normally biased to the position shown in FIG. 2 by means of a spring 181. When there is sufficient pressure in pilot line 183 to overcome the biasing force of the spring 181, the pressure compensator valve 175 is shifted to a position which permits the passage of fluid from the fluid conduit 177 through the fluid conduit 179 to the stroke control mechanism 173, thereby destroking the pump 171. It should be noted in FIG. 2 that when using a variable displacement pump which provides fluid at constant pressure and a variable flow rate, the auxiliary fluid circuit 145 must be of the closed center type. Thus, the three-position four-way valve 151 is a closed center valve. In the system shown in FIG. 2, it has been assumed, and will also be assumed in the system shown in FIG. 3, that the steering control valve 113 is not located "remotely" from the flow control valve 139, which, in the system of FIG. 2, may also be referred to as a priority valve. Therefore, in the system of FIG. 2, the signal line 167 is shown in fluid communication with the fluid conduit 141 at a point 165 which is upstream from the fluid inlet port 121, rather than being between the fluid inlet port and the variable orifice 135. Typically, the arrangement of poing 165 and signal line 167 as shown in FIG. 2 represents a pressure signal which is sensed internally of the priority valve 139 in the manner illustrated in U.S. Pat. No. 3,455,210, assigned to the assignee of the present invention and incorporated herein by reference.

Figure 3:
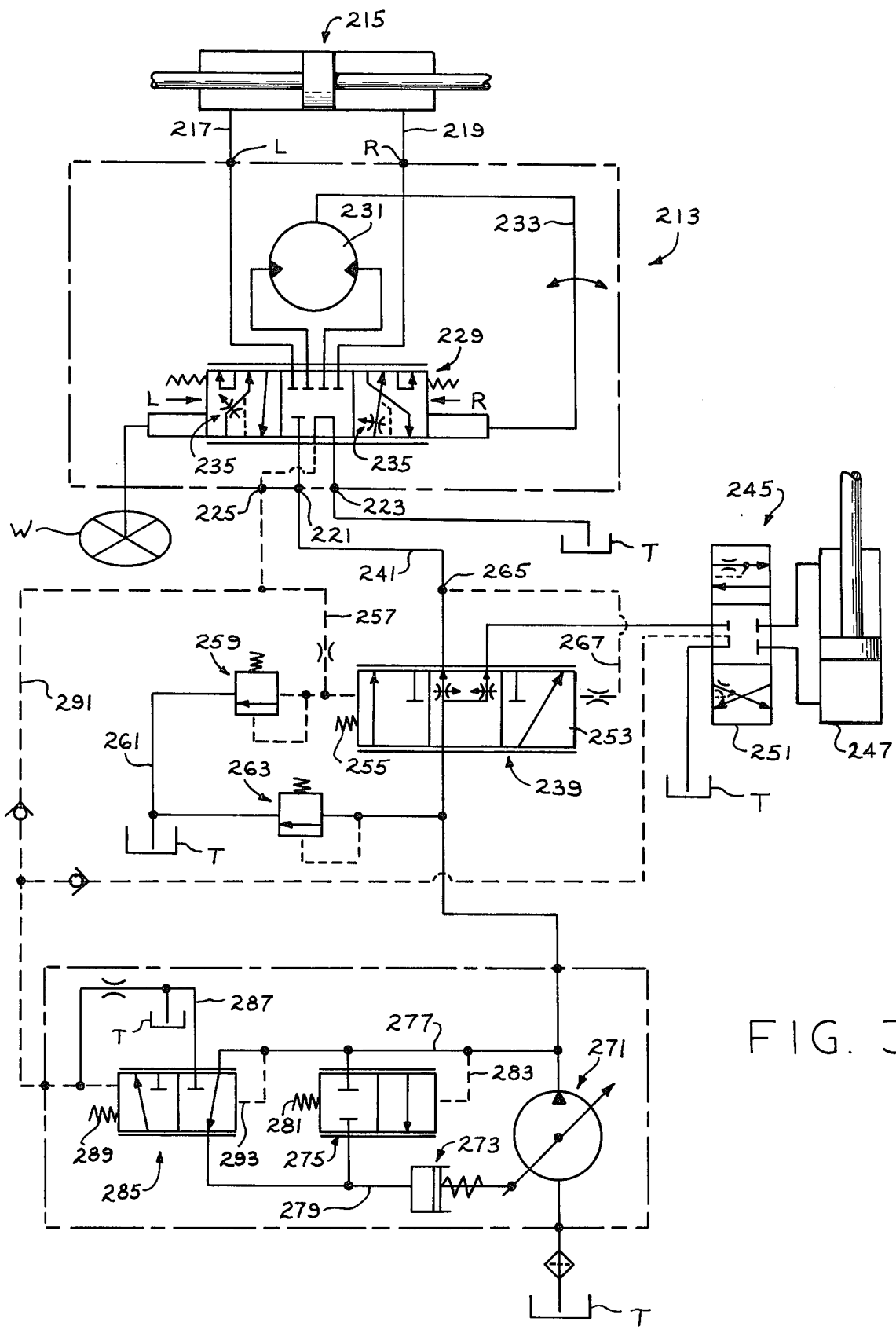

Referring now to FIG. 3, wherein like elements are referred to by like numerals, plus 100 again, the power steering system of the present invention is shown utilized with a variable displacement pump 271. The stroke of the pump 271 is varied by a stroke control mechanism 273 and a pressure compensator valve 275 in the manner described in connection with FIG. 2. In addition, a flow compensator valve 285 is in fluid communication with the fluid conduit 277 and has its outlet in fluid communication with fluid conduit 279. Also connected to the flow compensator valve 285 is a conduit 287, communicting with tank, and the flow compensator valve 285 is normally biased by a spring 289 toward a position permitting the passage of fluid conduit 279 to conduit 287, thus draining the stroke control mechanism 273 to tank. In fluid communicating with the load signal line 257 is a signal line 291, and the fluid pressure contained therein biases the flow compensator valve 285 in the same direction as the spring 289. When there is sufficient pressure in pilot line 293 to overcome the combined biasing forces of the spring 289 and the pressure in signal line 291, the flow compensator valve 285 is shifted to the position shown in FIG. 3 to permit the passage of fluid from the conduit 277 to conduit 279, and then to the stroke control mechanism 273 to destroke the pump. It will be noted that the auxiliary fluid circuit 245 is of the load sensing type, to match the loading sensing pump arrangement and that the pump responds to the higher of the two load signals, i.e., from the steering control valve 213 or fluid circuit 245.

Figure 5:
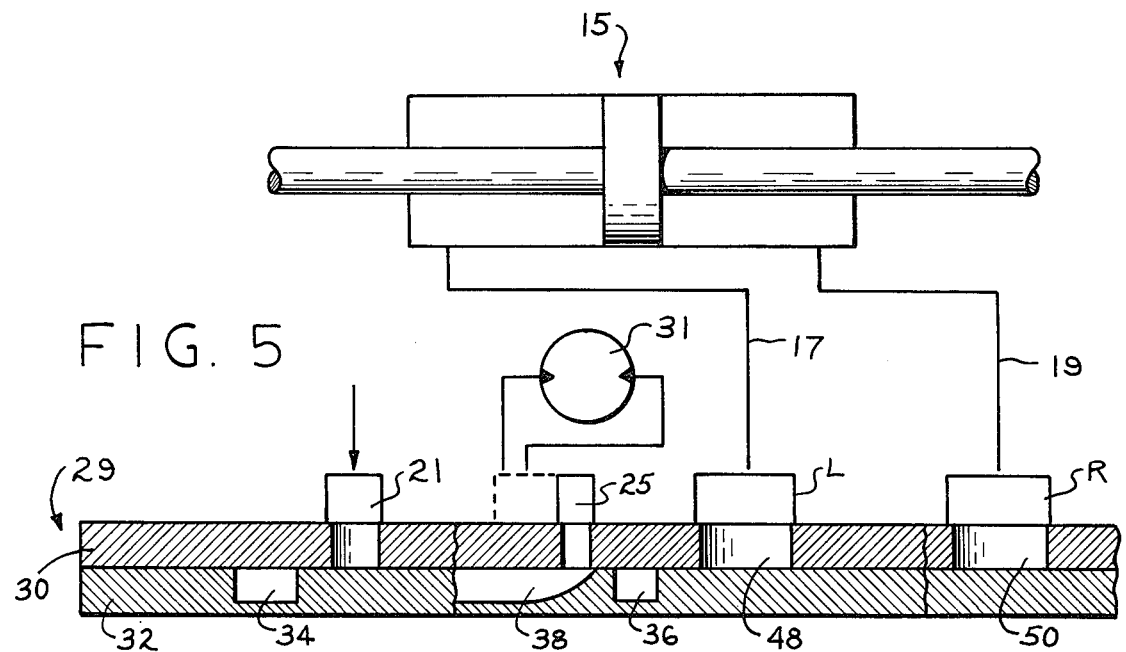
FIG. 5 is a semi-schematic cross section taken on line 5—5 of FIG. 4.
Figure 4:
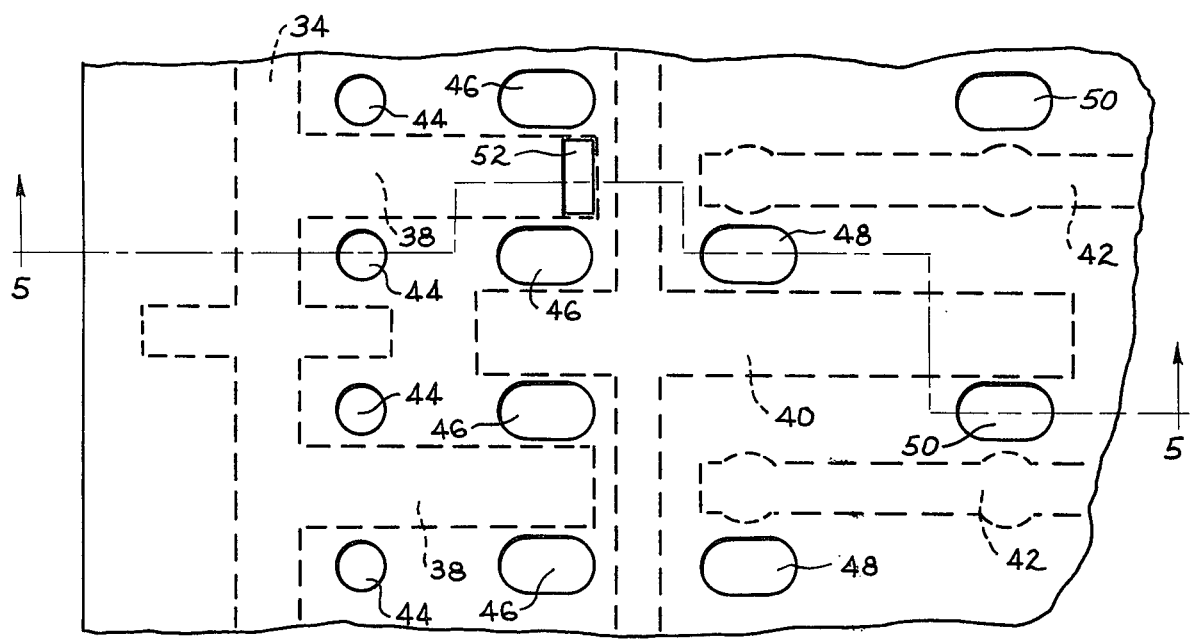
FIG. 4 is a fragmentary, overlay view of the valving used in the steering control valve of the present invention.

Referring now to FIGS. 4 and 5, there is shown in greater detail the valving arrangement 29, and in FIGS. 4 and 5 the valving 29 is in the neutral position. The valving 29 includes a valve sleeve 30 rotatable within the housing of the steering control valve 13, and a valve spool 32 which is rotatable relative to the valve sleeve 30. The construction and operation of a typical spool and sleeve valving arrangement is shown in greater detail in the above-incorporated U.S. Pat. No. Re.25,126. The valve spool 32 includes a circumferential groove 34 and a circumferential groove 36, with a plurality of axially-extending slots 38 communicating with the groove 34, and a plurality of axially-extending slots 40 communicating with the groove 36. The valve spool 32 also includes a plurality of axially-extending slots 42 through which the cylinder return fluid flows (to the right in FIG. 4) to tank.

The valve sleeve 30 defines a plurality of supply ports 44 in continuous fluid communication with the fluid inlet port 21 and, in the neutral position shown in FIGS. 4 and 5, inlet flow into the supply ports 44 is blocked by the outer surface of the valve spool 32, thus making valving arrangement 29 closed-center. Disposed to the right of the supply ports 44 is a plurality of meter passages 46 which are connected, alternately, to the expanding volume chambers of the meter 31 and the contracting volume chambers of the meter 31 in a manner well-known in the art. The valve sleeve 30 also defines a plurality of cylinder ports 48, in fluid communication with the left fluid port L, and a plurality of cylinder ports 50, in fluid communication with the right fluid port R. The valve sleeve 30 also includes one or more load sensing ports 52, which are in fluid communication between the adjacent axial slot 38 and the load signal port 25.

Figure 7:
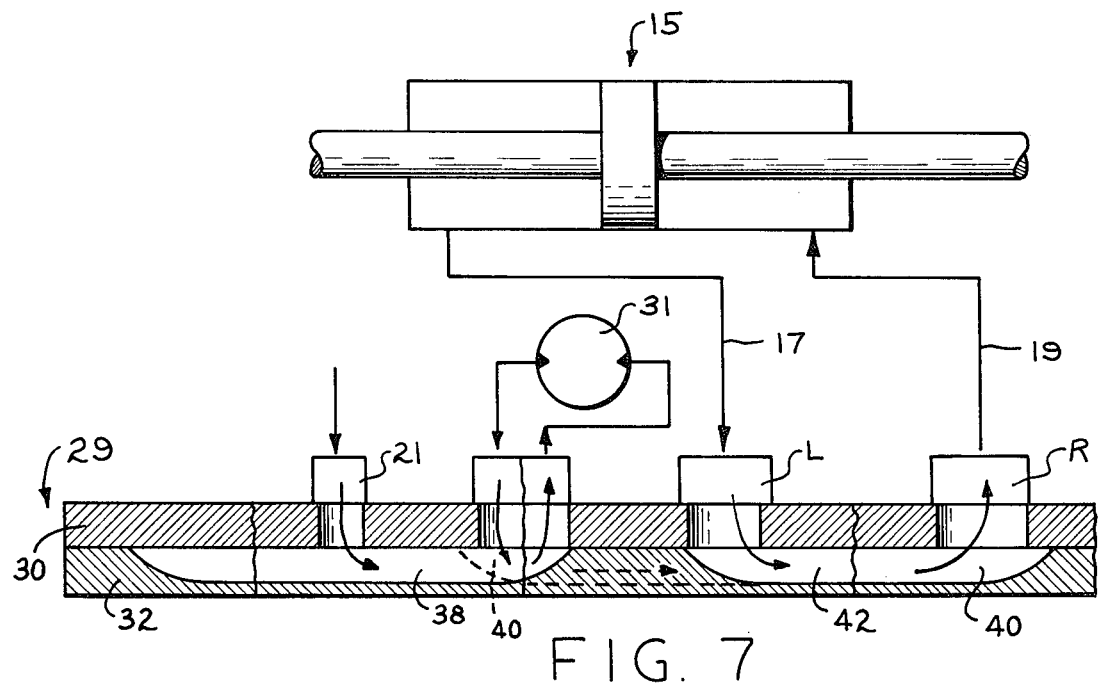
FIG. 7 is a semi-schematic cross section taken on line 7—7 of FIG. 6.
Figure 6:
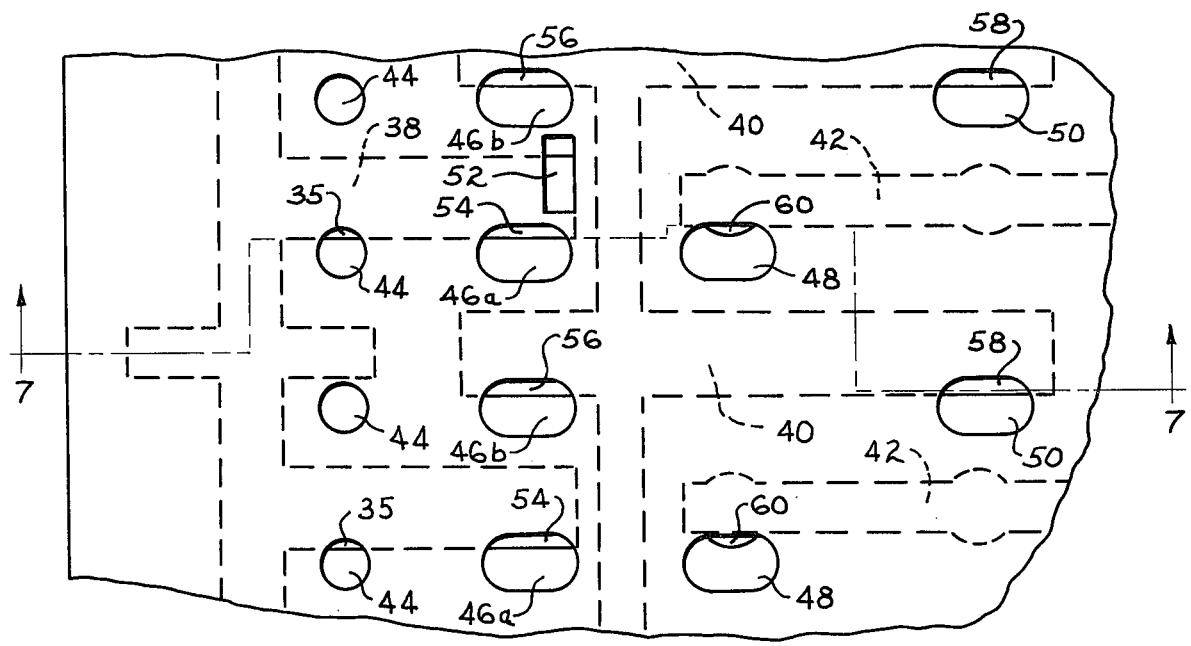
FIG. 6 is a fragmentary, overlay view of the valving, similar to FIG. 4, shown in a right turn position.

Referring now to FIGS. 6 and 7, the valving 29 is shown in a right turn position, with a valve deflection of approximately 5° (i.e., the valve spool 32 rotated 5° relative to the valve sleeve 30 from the neutral position). In this position, it may be seen in FIG. 6 that every other supply port 44 is in partial fluid communication with an adjacent slot 38 to define therebetween the first vairable orifice 35. As inlet fluid passes through the variable orifices 35, it flows through the slots 38, to the right in FIG. 6, and then through a plurality of second variable orifices 54 defined by the slots 38 and alternate ones of the meter ports, herein designated 46a. The metered fluid returning from the fluid memter 31 enters the alternate meter ports, herein designated 46b, which cooperate with the adjacent slots 40 to define a plurality of third variable orifices 56. The metered fluid passing through the orifices 56 flows through the slots 40 to the right in FIG. 6, then through a plurality of fourth variable orifices 58 defined by the slots 40 and cylinder ports 50. This metered fluid then flows through right fluid port R to the right end of the steering cylinder 15, and the displaced fluid in the left end of the cylinder 15 returns through the left fluid port L and enters the cylinder ports 48. This displaced fluid flows through a plurality of fifth variable orifices 60 defined by the cylinder ports 48 and the axial slots 42, from where the fluid passes to tank. It should be apparent to those skilled in the art that the flow path for a left turn will be similar to that for a right turn but, in certain cases, with alternate ports communicating with the respective slots.

In the preferred embodiment, the load sensing port 52 is disposed to communicate with fluid in the axial slot 38, between the first variable orifice 35 and the second variable orifice 54, although it should be understood that within the scope of the present invention, a steering load signal may be sensed after one of the subsequent variable orifices. For example, a load sensing port may be placed in fluid communication with the axial slots 40, thus sensing the steering load immediately downstream of the third variable orifices 56. In any event, the static pressure signal sensed in the load sensing port 52 is communicated to the load signal port 25, and then to the pressure compensating valve 39 as described previously.

As may be seen by viewing FIG. 1 in conjunction with FIGS. 4-7, the pressure signal sensed in the load sensing port is fully communicated to the flow control valve 39, i.e., none of the load signal pressure is drained off or relieved during the operative portion of the valve deflection. As a result, any change in the steering load causes the flow control valve 39 to fully adjust the fluid pressure fed to the steering control valve 13 through the fluid conduit 41 to maintain the predetermined pressure drop across the variable orifice 35 and, if a momentary change of the valve deflection occurs, thus changing the area of the orifice 35, a return to the predetermined pressure drop across the orifice 35 will permit the valving to return to its original deflection. For example, if the steering control valve 13 is designed to operate in response to a 100 psi pressure drop across the variable orifice 35, and the steering load is 500 psi, the flow control valve 39 will maintain a pressure of 600 psi (ignoring line losses and other drops) in fluid conduit 41, even if it is necessary for the valve member 53 to throttle down the pressure at the inlet to the valve 39, as is the case when the auxiliary fluid circuit 45 demands a pressure above the 600 psi needed in fluid conduit 41. Let is be assumed now that the steering load increases to 700 psi, such that the load signal line 57 contains a pressure of 700 psi, rather than a lower pressure as would be the case if the load signal were partially ported to drain. When the pressure in load signal line 57 rises to 700 psi, the velve member 53 will be baised to permit more fluid to pass to fluid conduit 41 until the pressure in conduit 41 rises to 800 psi to again have a 100 psi drop across the orifice 35. Therefore, the system of the present invention is "load insensitive," i.e., it will maintain substantially the same valve deflection, orifice area, flow rate and actuation speed independent of variations in the steering load. Furthermore, the system of the invention may be considered as "separating" the system variables, (flow and pressure), i.e., the system monitors steering system flow through the orifice 35 generally independent of steering system pressure and the priority valve 39 throttles steering system pressure generally independent of steering system flow.

I claim:

1. A fluid control system for selectively effecting actuation of a power steering motor to steer vehicle wheels and an auxiliary device, said system comprising:
   a. source of pressurized fluid;
   b. a steering control valve disposed in series flow relationship between said fluid source and the steering motor, said steering control valve defining an inlet port and including valving movable selectively from a neutral position to right turn and left turn positions, a fluid meter including a metering element movable to measure the volume of fluid passing therethrough, and means coupling said metering member and said valving to impart follow-up movement thereto responsive to movement of said metering member;
   c. said steering control valve and said valving defining fluid passage means including a first variable orifice operable to establish a fluid flow rate through said passage means, a second orifice operable to establish a fluid flow direction through said fluid meter, and a third orifice disposed between said fluid meter and the steering motor;
   d. a flow control valve disposed in series flow relationship between said fluid source and said first variable orifice of said steering control valve, said fluid source comprising the sole source of pressurized fluid for actuation of the power steering motor and the auxiliary device, said flow control valve including an inlet port in fluid communication with said fluid source, a steering outlet port in fluid communication with said first variable orifice of said steering control valve, and an auxiliary outlet port in fluid communication with the auxiliary device;
   e. said flow control valve including valve means disposed to control fluid flow from said inlet port to said outlet ports, and means biasing said valve means toward a position permitting substantially all of the system flow to pass from said inlet port to said steering outlet port;
   f. meanns communicating a first pressure signal from immediately downstream of said first variable orifice to exert a biasing force on said valve means in the same direction as said biasing means; and
   g. means communicating a second pressure signal from immediately upstream of said first variable orifice to exert a biasing force on said valve means in opposition to that of said biasing means to maintain a generally constant pressure drop across said first variable orifice as said fluid flow rate varies between a minimum and a maximum.

2. A fluid control system as claimed in claim 1 wherein said valve means has oppositely facing surfaces thereon subjected, respectively, to said first and second pressure signals.

3. A fluid control system as claimed in claim 2 wherein said value means is positioned in accordance with the hydraulic pressure differential between said first and second pressure signals to control the flow of fluid from said inlet port to said auxiliary and steering outlet ports independent of the fluid pressure at said auxiliary outlet port.

4. A fluid control system as claimed in claim 1 wherein said source of pressurized fluid comprises a fixed displacement pump and the auxiliary device is an open-center type.

5. A fluid control system as claimed in claim 1 wherein said source of pressurized fluid comprises a variable displacement pump including stroke control means for said pump and a pressure compensator valve disposed in fluid communication between the output of said pump and said stroke control means and the auxiliary device is a closed-center type.

6. A fluid control system as claimed in claim 1 wherein said source of pressurized fluid comprises a floww and pressure compensated pump system including a variable displacement pump, stroke control means for said pump, a pressure compensator valve disposed in fluid communication between the output of said pump and said stroke control means, and a flow compensator valve disposed in fluid communication with said first pressure signal and said stroke control means and the auxiliary device is a load sensing type.

7. A fluid control system as claimed in claim 1 wherein said steering control valve comprises a valve body defining a valve bore, and said valving includes a primary, rotatable valve member and a cooperating, relatively rotatable follow-up valve memmber, said primary and follow-up valve members defining said neutral position, and being relatively rotatable in opposite directions from said neutral position to define said left turn and right turn positions.

8. A fluid control system as claimed in claim 7 wherein one of said primary and follow-up valve members defines a plurality of supply ports in continuous fluid communication with said inlet port of said steering control valve, and a plurality of meter ports in fluid communication with said fluid meter, the other of said valve members defining a plurality of fluid passages adapted to provide fluid communication between said supply ports and said meter ports when said valve members define one of said turn positions.

9. A fluid control system as claimed in claim 8 wherein each of said plurality of supply ports and the associated fluid passage cooperate to define said first variable orifice.

10. A system for controlling the flow of fluid from a source of fluid which is selectively a fixed displacement pump, a pressure-compensated, variable displacement pump or a flow and pressure compensated, load-sensing pump to selectively effect actuation of a power steering motor and an auxiliary device, which is an open-center type, closed-center type, or a load-sensing type, respectively, said system comprising:
   a. a steering control valve disposed in series flow relationship between the fluid source and the steering motor, said steering control valve including valving movable from a neutral position to right turn and left turn positions, selectively, a fluid meter including a metering element movable to measure the volume of fluid passing therethrough, and means coupling said metering member and said valving to impart follow-up movement thereto responsive to movement of said metering member;
   b. said steering control valve including a valve body, said valving body defining fluid inlet and fluid return ports and a pair of motor ports to be connected to said power steering motor, said valve body and said valving defining a fluid passage means including a first variable orifice disposed in series flow relationship between said fluid inlet port and said fluid meter, said valving being configured to have a predetermined pressure drop across said first variable orifice when said valving is in said right turn and left turn positions;
   c. a priority valve disposed in series flow relationship between the fluid source and said steering control valve, said priority valve including an inlet port in fluid communication with the fluid source, a steering outlet port in fluid communication with said fluid inlet port of said steering control valve, and an auxiliary outlet port in fluid communication with the auxiliary device;
   d. said priority valve including a valve member disposed to control fluid flow from said inlet port to said outlet ports, and means biasing said valving member toward a position permitting substantially all of the system flow to pass from said inlet port to said steering outlet port, said biasing means exerting a biasing force approximately equivalent to said predetermined pressure drop across said first variable orifice to establish a steering flow rate through said steering outlet port and said first variable orifice;
   e. means communicating a load pressure signal from the downstream side of said first variable orifice to exert a biasing force acting on said valve member in the same direction as said biasing means; and
   f. means communicating a pilot pressure signal from a location between said valve member and said first variable orifice to exert a biasing force on said valve member in opposition to that exerted by said biasing means.

11. A system as claimed in claim 10 wherein said valve member of said priority valve is operable to throttle fluid pressure at said steering outlet port when the fluid pressure at said inlet port of said priority valve exceeds the pressure required at said steering outlet port to maintain said predetermined pressure drop across said first variable orifice.

12. A system as claimed in claim 10 wherein said means communicating said pilot pressure signal comprises said valve body of said steering control valve defining a pilot port in fluid communication with said fluid inlet port of said steering control valve.

13. A hydrostatic power steering system for selectively effecting actuation of a steering motor to steer vehicle wheels and an auxiliary device, said system comprising:
   a. a sole source of pressurized fluid for the steering motor and the auxiliary device;
   b. a steering control valve disposed in series flow relationship between said fluid source and the steering motor, and defining a first variable orifice operable to establish a fluid flow rate from said steering control valve to the steering motor;
   c. A flow control valve disposed in series flow relationship between said fluid source and said first variable orifice of said steering control valve, said flow control valve including an inlet port in fluid communication with said fluid source, a steering outlet port in fluid communication with said first variable orifice of said steering control valve, and an auxiliary outlet port in fluid communication with the auxiliary device;
   d. said flow control valve including valve means disposed to control fluid flow from said inlet port to said outlet ports, and means biasing said valve means toward a position permitting substantially all of the system flow to pass from said inlet port to said steering outlet port;
   e. means communicating a first pressure signal from immediately downstream of said first variable orifice to exert a biasing force on said valve means in the same direction as said biasing means; and
   f. means communicating a second pressure signal from upstream of said first variable orifice to exert a biasing force on said valve means in opposition to that of said biasing means to maintain a generally constant pressure drop across said first variable orifice as said fluid flow rate varies between a minimum and a maximum.

14. A power steering system as claimed in claim 13 wherein said valve means has oppositely facing surfaces thereon subjected, respectively, to said first and second pressure signals.

15. A power steering system as claimed in claim 14 wherein said valve means is positioned in accordance with the hydraulic pressure differential between said first and second pressure signals to control the flow of fluid from said inlet port to said auxiliary and steering outlet ports independent of the fluid pressure at said auxiliary outlet port.

16. A fluid control system as claimed in claim 10 wherein said valve member has oppositely facing surfaces thereon subjected, respectively, to said load pressure signal and said pilot pressure signal.

17. A fluid control system as claimed in claim 16 wherein siad valve member is positioned in accordance with the hydraulic pressure differential between said load pressure signal and said pilot pressure signal to control the flow of fluid from said inlet port to said steering outlet port and said auxiliary outlet port independent of the fluid pressure at said auxiliary outlet port.

18. A fluid control system as claimed in claim 17 wherein said valve member of said priority valve is operable to throttle fluid pressure at said steering outlet port when the fluid pressure at said inlet port of said priority valve and said auxiliary outlet port exceed the pressure required at said steering outlet port to maintain said predetermined pressure drop across said first variable orifice.

* * * * *

UNITED STATES PATENT AND TRADEMARK OFFICE
CERTIFICATE OF CORRECTION

PATENT NO. : 4,043,419

DATED : August 23, 1977

INVENTOR(S) : Bernard J. Larson; Oliver W. Johnson; James K-F Yip.

It is certified that error appears in the above-identified patent and that said Letters Patent are hereby corrected as shown below:

| | |
|---|---|
| Col. 1, line 45: | "3,445,210" should read "3,455,210". |
| Col. 2, line 3: | "means" should read "mean". |
| Col. 3, line 43: | After "power" insert "steering". |
| Col. 4, line 41: | "varible" should read "variable". |
| line 60: | "firt" should read "first". |
| Col. 6, line 36: | "conduis" should read "conduit". |
| line 58: | "proprotion" should read "proportion". |
| Col. 7, line 26: | "poing" should read "point". |
| line 43: | "communicting" should read "communicating". |
| line 45: | After "fluid" insert "from". |
| line 47: | "communicating" should read "communication". |
| line 59: | "loading" should read "load". |
| Col. 8, line 36: | "vairable" should read "variable". |
| line 41: | "memter" should read "meter". |
| Col. 9, line 34: | "velve" should read "valve. |
| line 34: | "baised" should read "biased". |
| Col. 10, line 20: | "meanns" should read "means". |
| line 36: | "value" should read "valve". |
| line 55: | "floww" should read "flow". |
| line 67: | "memmber" should read "member". |
| Col. 11, line 38: | "valving" should read "valve". |
| line 58: | "valving" should read "valve". |
| Col. 13, line 6: | "siad" should read "said". |

Signed and Sealed this

Twenty-second Day of November 1977

[SEAL]

Attest:

RUTH C. MASON
Attesting Officer

LUTRELLE F. PARKER
Acting Commissioner of Patents and Trademarks